June 29, 1965 N. K. PLUNSKE 3,191,462

CENTERING TOOL

Filed Nov. 23, 1962

INVENTOR.
NORMAN K. PLUNSKE.

BY

ATTORNEY

United States Patent Office 3,191,462
Patented June 29, 1965

3,191,462
CENTERING TOOL
Norman K. Plunske, 240 Sun Valley Drive,
Southington, Conn.
Filed Nov. 23, 1962, Ser. No. 239,479
12 Claims. (Cl. 77—55)

The present invention relates to tools for locating and identifying the center of an aperture such as in workpieces or in templates for laying out and drilling a plurality of apertures in workpieces.

In many manufacturing operations, it is customary to use a template or fixture having a plurality of apertures located therein according to a desired pattern as a means for locating similar apertures to be drilled in a workpiece and often for a guide in drilling the actual apertures. In other manufacturing operations, it is often desirable to locate precisely the center of an existing aperture in a workpiece for drilling or boring a centered hole of lesser or varying cross section.

It is an object of the present invention to provide a tool for rapidly locating the center of apertures of various configurations and sizes and which is relatively simple and economical to manufacture.

Another object is to provide such a centering tool which will permit limited free axial movement of the locating member carried therein and also permit ready removal or insertion of the locating member without disassembly of the body of the tool.

It is also an object to provide such a tool for centering a center drill within the aperture of a workpiece or a template to enable precise drilling of the hole in the desired location.

Other objects and advantages will be apparent from the following detailed description and claims and the attached drawing wherein:

Figure 1:
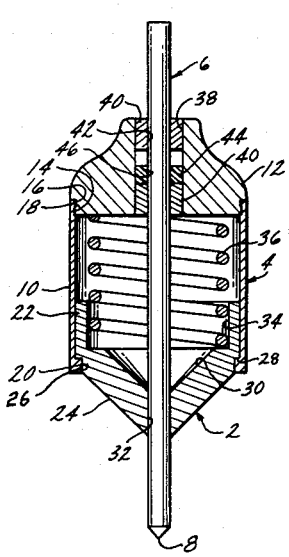
FIGURE 1 is a sectional view in elevation of a spotting tool embodying the present invention in the at-rest position.

It has now been found that the foregoing and related objects can be readily attained by a centering tool generally comprised of a housing having a tubular body portion at one end and a closure portion at the other end, and a centering element slidably seated within said tubular body portion and having a generally conical portion extending outwardly thereof, the centering member and closure portions having apertures extending therethrough in alignment with each other and with the center of the tubular body portion. Slidably seated in the apertures is a locating member having an elongated slide portion dimensioned to extend outwardly of the closure portion and centering element, and the aperture in the closure portion is dimensioned to provide a slide support portion and an axially extending portion of enlarged cross section intermediate the length thereof. In this enlarged axial portion is a collar of resiliently deformable material having an axial aperture therethrough of lesser cross-sectional area than the cross section of the locating member to engage frictionally the periphery thereof and being of lesser external transverse dimension than the enlarged aperture portion to permit expansion thereof upon insertion of the locating member thereinto. In this manner, the collar will frictionally engage the locating member to limit its free axial movement but will permit relative movement therethrough upon application of axial force to the locating member.

The axial length of the collar should be less than the axial length of the enlarged aperture portion so as to permit a limited amount of free axial movement of the collar and thereby the locating member. The collar is most desirably fabricated from a synthetic plastic material of high lubricity so as to permit relatively facile movement of the locating member therethrough upon application of axial force to the locating member. A spring or other resiliently compressible means in the housing is utilized to bias the centering member outwardly of the housing and stop means are provided to limit the outward movement and retain the centering element therein.

In one embodiment of the invention, a pair of metal bushings are spaced apart in an aperture of uniform cross section extending through the closure portion and the collar is seated in the axial spacing between the bushings. In another embodiment, ball bearing assemblies are provided in the centering element and in the closure portion of the housing to provide a highly effective rotational bearing assembly for a center drill having a drill tip at the one end extending out from the centering element and a shank portion at the other end adapted to be mounted in a drill chuck. In both of these embodiments, the spacing of the collar may be used to permit limited free axial movement of the centering element, and thereby a limited penetration into the workpiece can be readily effected.

In the preferred form of construction, the housing is provided by a tubular body element having a generally cylindrical configuration with a radial lip extending about the inner periphery of one end thereof which snaps into a groove in the outer periphery of a closure element adjacent one end thereof. The body element also has a radial flange extending inwardly about the periphery of the other end thereof which abuts against a peripheral shoulder on the centering element to limit its movement outwardly of the housing.

Figure 2:
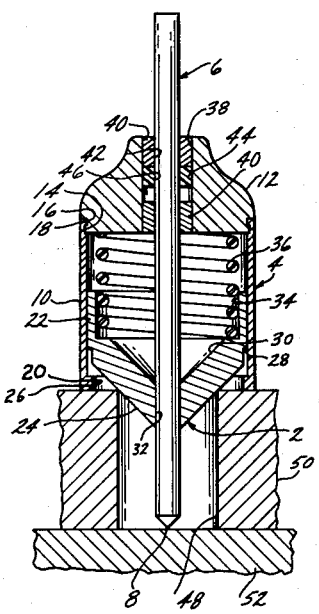
FIGURE 2 is a similar view showing the tool in operative position upon a template and workpiece which are illustrated in fragmentary section.
Figure 3:
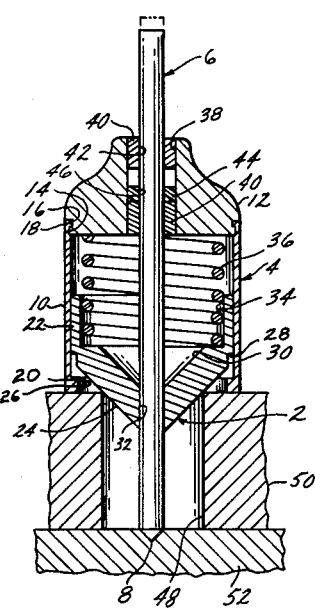
FIGURE 3 is a view similar to FIGURE 2 showing the tool after the spotting pin has been driven into the workpiece with the initial position thereof shown in phantom.

Referring now in detail to FIGURES 1–3 of the attached drawing, a spotting tool embodying the present invention has a centering element generally designated by the numeral 2 which is slidably seated in the housing generally designated by the numeral 4. Slidably seated in the housing 4 and centering element 2 is an elongated spotting pin 6 having a pointed end 8 adapted to be driven into metal or other material.

More particularly, the housing 4 is constructed of a tubular body element 10 of generally cylindrical configuration and a closure element 12 of circular cross section and generally bell-shaped configuration. The relatively thin-walled tubular body element 10 has a channel 14 extending about its inner periphery spaced closely adjacent the inner end thereof which provides an inwardly extending radial lip about the inner end 16 which extends into a groove 18 extending about the outer periphery of the closure element 12 adjacent the inner end thereof to provide a snap-fitting interlock therebetween. The body element 10 also has a radial flange 20 extending inwardly about the periphery of the other end thereof for a purpose to be described hereinafter.

The centering element 2 has a generally cylindrical body portion 22 at one end thereof dimensioned to seat slidably in close-fitting relationship within the tubular body element 10 and ensure sliding action parallel to the axis. At its other end, the centering element has a generally conical portion 24 which projects outwardly of the body element 10 and is machined or formed with a peripheral notch 26 providing an outwardly facing radial shoulder 28 which abuts against the flange 20 of the body element 10 to limit movement of the centering element outwardly thereof. The centering element has an aperture 30 extending axially through the center thereof with a portion of relatively small diameter 32 at the outer end of the conical portion 24 and a portion of enlarged diameter 34 in the cylindrical body portion 22. Seated in the enlarged diameter portion 34 of the centering element aperture 30 is a coil spring 36 which acts against the inner wall of the closure element 12 to bias the centering element 2 outwardly of the housing 4.

The closure element 12 has an axially extending aperture 38 therethrough which is coaxial with and of larger diameter than the reduced diameter aperture portion 32 of the centering element. Snugly seated within the aperture 38 in axially spaced relationship are a pair of annular metal bearing elements 40 each having an aperture 42 extending axially therethrough substantially equal in diameter to the diameter of the reduced aperture portion 32 of the centering element 2. The spotting pin 6 and apertures 32, 42 are cooperatively dimensioned to provide a firm but sliding fit of the pin 6 therein and thus avoid wobbling.

An annular collar 44 is disposed in the aperture 38 between the bearing elements 40 and is of lesser axial length than the axial spacing therebetween so as to have a limited amount of axial movement therebetween. As fabricated, the aperture 46 is of somewhat lesser diameter than the diameter of the spotting pin 6 so as to engage frictionally the surface thereof, and the outer diameter of the collar is less than the diameter of the aperture 38 in the closure element 12 so as to provide radial spacing and permit radial expansion upon insertion of the pin thereinto. The collar 44 is made of a resiliently deformable synthetic plastic material having a relatively high degree of lubricity to permit ready sliding of the pin 6 therethrough upon application of axial force to the end of the pin and to provide continued frictional engagement of the pin despite repeated insertions and withdrawals therefrom.

Referring to the operation of the tool as best understood from FIGURES 2 and 3, the conical portion 24 of the centering element 2 is inserted into an aperture 48 such as that in the template 50 for locating the center of a proposed drill hole in a workpiece 52. The housing 4 is then pressed downwardly to compress the spring until the bottom edge and radial flange 20 of the body element 10 seat firmly upon the surface of the template 50 about the aperture 48, thus levelling the tool and ensuring its perpendicularity to the template. The point 8 of the spotting pin 6 will generally bottom in the aperture 48 against the surface of the workpiece 52 during the levelling movement and will slide upwardly in the bearing elements 40. Since the collar 44 is frictionally engaged with the pin 6, it moves upwardly therewith until it abuts against the upper of the bearing elements 40 as shown in FIGURE 2. When the upper end of the spotting pin 6 is then struck with a hammer or other suitable tool (not shown), the point 8 is driven downwardly into the workpiece 52 to make an identifying mark. During the downward movement of the spotting pin 6, the collar 44 moves therewith into the position shown in FIGURE 3.

By proper dimensioning of the axial spacing between the bearing members 40 and the collar 44, sufficient free movement of the collar 44 and pin 6 can be provided to avoid relative movement therebetween during actual working, particularly during impact loads upon the pin, and thus minimize distortion and excessive stresses upon the collar. However, it can be appreciated that although th collar will frictionally engage the pin in the at-rest position sufficiently to prevent its relative movement in the absence of an applied axial force, the dimensioning of these two elements permits relative axial movement of the pin. Thus, the pin may be readily removed for substitution with a longer pin if so desired or replacement after sufficient wear without disassembly of the housing.

The tool is readily and simply constructed from components which may themselves be easily fabricated. The pin should have a hardened point and the centering element is preferably of a hardened tool steel to prevent excessive wear during its contact with templates or workpieces. The collar is readily fabricated from nylon, high density polyethylene or other resilient synthetic plastics having a high degree of lubricity, and the bearing elements may be of any suitable, long-lasting bearing material such as brass, bronze or high lubricity plastics.

To assemble the unit, the bearings and collar are inserted within the aperture of the closure element and the spring and centering element are placed within the tubular body element. The tubular body element which is relatively resiliently deformable is then forced over the inner end of the closure element until the lip snaps into the groove to interlock the two elements together. Finally, the pin is inserted through the bearing elements and collar and then through the centering element. To disassemble the two housing components, a suitable fixture is employed to hold the tubular body element against movement and the centering element is pushed against the inner end of the closure element sufficiently to spring the lip of the body element outwardly from the groove and thus release the closure element.

Figure 4:
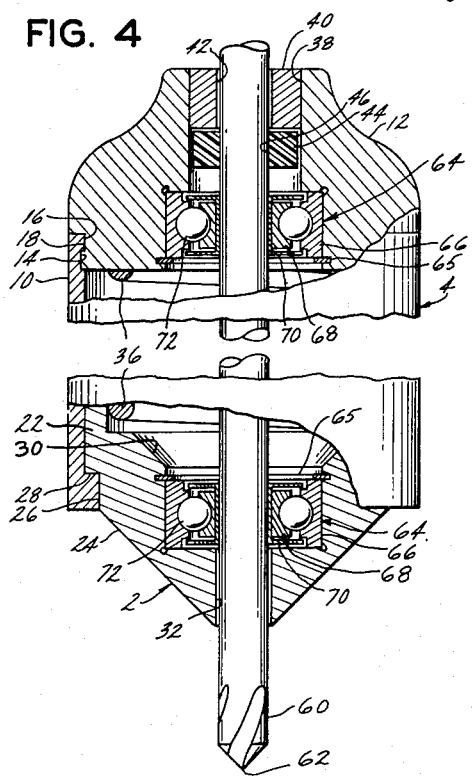
FIGURE 4 is a fragmentary side elevational view of another embodiment of the invention using a center drill with portions of the tool housing broken away to reveal internal construction.

Referring now to the embodiment of FIGURE 4, therein is illustrated a tool employing a center drill 60 as the locating element with a drill tip 62 of limited axial length at its lower end. The housing and centering elements are constructed similarly to the embodiment of FIGURES 1-3 except that the aperture 30 in the centering element is slightly larger than the drill 60 throughout its length and the apertures 30 and 38 of the centering element and closure elements respectively have enlarged portions accommodating ball bearing assemblies 64 which are firmly retained in place by locking rings 65.

The outer race 66 and inner race 68 of the ball bearing assemblies slide on the balls 72 and are maintained in assembly by the sleeve 70 which extends along the inner surface of the ball bearing assembly to provide a relatively tight fit with the drill 60 which, however, will permit relative axial sliding movement therebetween upon application of axial force to the drill. In the use of this embodiment, the drill 60 is similarly centered within an aperture and is rotated by mounting the upper end (not shown) of the drill 60 in the chuck of a suitable tool (not shown).

As will be readily appreciated, various types of bearings may be employed for the centering element or they may be omitted altogether albeit with greater wear. Also, bearing elements may be placed in the centering element for tools employing a spotting pin to reduce further any friction or wear. It is essential, however, that there be an axially extending portion of enlarged diameter intermediate the length of the aperture in the closure element in which the centering element is slidably received to provide a space for the collar and for limited axial movement thereof, thereby providing limited free axial movement of the centering element.

When the aperture in which the tool is to be inserted is of irregular shape, it will be appreciated that the conical portion will seat in the narrowest dimension and locate the center thereof. However, the tool will readily locate the exact center of circular or regularly polygonal apertures.

Thus, it can be seen that the centering tool of the present invention will rapidly locate the center of apertures of various configurations and sizes and is relatively simple and economical to manufacture. The centering element may be readily adjusted in length or interchanged without disassembly of the tool and may be permitted a limited amount of free axial movement to reduce friction and wear.

Although but one specific embodiment of the invention has been shown and described herein, it will be understood that modifications may be made within the spirit of the invention.

Having thus described the invention, I claim:

1. A tool for locating the center of an aperture comprising a housing having a tubular body portion at one end with a closure portion at the other end thereof, said closure portion having an aperture extending therethrough aligned with the center of said body portion; a centering element slidably received within said housing and having a generally conical portion extending outwardly of said one end of the housing and an aperture extending therethrough aligned with the aperture of said housing; resiliently compressible means in said housing biasing said centering element outwardly thereof; means limiting movement of said centering element outwardly of said housing; a locating member having an elongated slide portion slidably seated in the apertures of said closure portion and centering element and dimensioned to extend outwardly of said centering member and closure portion, said aperture in the closure portion having a portion dimensioned to provide sliding support for said locating member and an axially extending portion of enlarged cross section intermediate the length thereof; and a collar of resiliently deformable material in said enlarged cross-sectional portion of the closure aperture, said collar being of lesser axial dimension than said enlarged cross-sectional aperture portion and having an axial aperture therethrough of lesser cross-sectional area than the cross section of said locating member to engage frictionally the periphery of said locating member, said collar being of lesser external transverse dimension than said aperture in the closure portion to permit expansion thereof upon insertion of the locating member thereinto, said collar having limited axial movement in said enlarged aperture portion to permit limited free axial movement of said locating member and permitting relative axial movement of said locating member upon application of axial force to said locating member to move it therethrough.

2. A tool for locating the center of an aperture comprising a housing having a tubular body portion at one end with a closure portion at the other end thereof, said closure portion having an aperture extending therethrough aligned with the center of said body portion; a centering element slidably received within said housing and having a generally conical portion extending outwardly of said one end of the housing and an aperture extending therethrough aligned with the aperture of said housing; resiliently compressible means in said housing biasing said centering element outwardly thereof; means limiting movement of said centering element outwardly of said housing; a pair of axially spaced bearing elements in said aperture of said closure portion having apertures extending therethrough in alignment with the aperture of said centering element; a locating member having an elongated slide portion slidably seated in said bearing elements and aperture of the centering element and the closure portion of said housing; and a collar of resiliently deformable material in the axial spacing between said pair of bearing elements having an aperture therein through which said locating member extends, said collar being frictionally engaged with said locating member to limit free axial movement thereof relative to said housing, said collar and locating member being dimensioned to permit relative axial movement upon application of axial force to said locating member.

3. The tool in accordance with claim 2 wherein said collar is fabricated from synthetic plastic material exhibiting relatively high lubricity and is fabricated with its aperture of slightly lesser dimension than the cross section of the locating member and its outer dimension smaller than the aperture in said closure element to permit expansion thereof upon insertion of the locating member thereinto.

4. The tool in accordance with claim 2 wherein said locating member is an elongated pin having a point at its end extending outwardly of the centering element adapted to mark a workpiece upon application of axial force to the other end thereof.

5. The tool in accordance with claim 2 wherein said locating member has a center drill tip at the end extending outwardly of said centering element and a shank portion adapted to be mounted in a drill chuck at the other end thereof.

6. The tool in accordance with claim 2 wherein said collar is of lesser axial dimension than the spacing between said bearing elements to permit a limited amount of free axial movement of said locating member and collar therebetween.

7. A tool for locating the center of an aperture comprising a housing having a tubular body portion of generally cylindrical configuration at one end thereof and a closure portion at the other end thereof having a generally cylindrical aperture extending therethrough coaxial with said body portion; a centering element having a generally conical portion extending outwardly of said one end of the housing and a generally cylindrical aperture extending therethrough coaxial with the apertures of said housing; a spring in said housing biasing said centering element outwardly thereof; means limiting movement of said centering element outwardly of said housing; a pair of axially spaced bearing elements in said aperture of said closure portion having cylindrical apertures extending therethrough coaxial with said aperture of the centering element; a locating member having an elongated slide portion of generally cylindrical configuration slidably seated in said bearing elements and aperture of the centering element and dimensioned to extend outwardly of said centering member and the closure portion of said housing; and an annular collar of resiliently deformable synthetic plastic material in the axial spacing between said pair of bearing elements and of lesser axial dimension than said spacing, said annular collar being dimensioned with an internal diameter less than that of the locating pin to engage frictionally the periphery of said locating pin and of lesser external diameter than the diameter of said aperture in the closure portion to permit expansion thereof upon insertion of the locating member thereinto, said collar having limited axial movement in the spacing between said bearing elements to permit limited free axial movement of said locating member and permitting relative axial movement of said locating member upon application of axial force to said locating member to move it therethrough.

8. The tool in accordance with claim 7 wherein said bearing elements are annular bearings.

9. The tool in accordance with claim 7 wherein one of said bearing elements is a ball bearing assembly and wherein said aperture of the centering member is provided with a ball bearing assembly to provide a rotatable and sliding seat and wherein said locating member has a center drill tip at the end thereof projecting from said centering member.

10. A tool for locating the center of an aperture comprising a housing having a generally cylindrical tubular body portion at one end and a closure portion at the other end thereof, said closure portion having a generally cylindrical aperture extending therethrough coaxial with said body portion; a centering element having a generally cylindrical body portion slidably seated within said body portion of the housing and a generally conical portion extending outwardly of said one end of the housing, said centering element having a generally cylindrical aperture extending therethrough coaxial with the apertures of said housing, said body portion of the housing having an inwardly extending flange and said centering element having a cooperating shoulder engageable therewith to limit movement of the body portion of said centering element outwardly of the housing; spring means in said housing biasing said centering element outwardly thereof; bearing means in said aperture of said closure portion having a coaxial cylindrical aperture extending therethrough; a locating member having an elongated cylindrical slide portion slidably seated in said bearing means and aperture of the centering element and dimensioned to extend outwardly of said centering member and the closure portion of said housing; and limiting means in said closure portion frictionally engaged with said locating member to limit free axial movement thereof relative to said housing and permitting relative axial movement upon application of axial force to said locating member.

11. A tool for locating the center of an aperture comprising a tubular body element of generally cylindrical configuration and having a radial flange extending about the inner periphery at one end thereof and a radial lip extending about the inner periphery of the other end thereof; a closure element engaged with said other end of the body element and having an aperture extending therethrough coaxial with said body element, said closure element having a groove extending about its outer periphery adjacent the inner end thereof into which said lip extends to provide interlocking engagement therebetween; a centering element having a generally cylindrical body portion slidably seated within said body element and a generally conical portion projecting outwardly of said body element, said centering element having a peripheral shoulder about its outer periphery adjacent said conical portion engageable with the flange of the body element to limit movement of said centering element outwardly thereof, said conical portion having a cylindrical aperture extending therethrough coaxial with said body element and said body portion having an aperture therein of enlarged cross section; a spring seated in said enlarged aperture of the centering element and operating against said closure element to bias said centering element outwardly of said body element; bearing means in said aperture of said closure element having cylindrical aperture extending therethrough coaxial with the apertures of said centering element; a locating member having an elongated cylindrical slide portion slidably seated in said bearing means and aperture of the conical portion of the centering element and dimensioned to extend outwardly of said centering member and closure member; and limiting means in said closure element frictionally engaged with said locating member to limit free axial movement thereof relative to said housing and permitting relative axial movement upon application of axial forces to said locating member.

12. A tool for locating the center of an aperture comprising tubular body element of generally cylindrical configuration and having a radial flange extending about the inner periphery at one end thereof and a radial lip extending about the inner periphery of the other end thereof; a closure element engaged with said other end of the body element and having an aperture extending therethrough coaxial with said body element, said closure element having a groove extending about its outer periphery adjacent the inner end thereof into which said lip extends to provide interlocking engagement therebetween; a centering element having a generally cylindrical body portion slidably seated within said body element and a generally conical portion projecting outwardly of said body element, said centering element having a peripheral shoulder about its outer periphery adjacent said conical portion engageable with the flange of the body element to limit movement of said centering element outwardly thereof, said conical portion having a cylindrical aperture extending therethrough coaxial with said body element and said body portion having an aperture therein of enlarged cross section; a spring seated in said enlarged aperture of the centering element and operating against said closure element to bias said centering element outwardly of said body element; a pair of axially spaced bearing elements in said aperture of said closure element having cylindrical apertures extending therethrough and coaxial with the aperture of the conical portion of the centering element; a locating member having an elongated cylindrical slide portion slidably seated in said bearing means and aperture of the conical portion of the centering element and dimensioned to extend outwardly of said centering member and closure member; and an annular collar of resiliently deformable material in the axial spacing between said bearing elements and of lesser axial dimension than said spacing, said collar being dimensioned with an aperture of lesser diameter than the diameter of said locating member to frictionally engage the periphery of said locating member and an outer diameter of lesser diameter than the diameter of said aperture in the closure element to permit expansion thereof upon insertion of the locating member thereinto, said collar having limited axial movement between said bearing elements to permit limited free axial movement of said locating member and permitting relative axial movement of said locating member upon application of axial force to said locating member to move it therethrough.

References Cited by the Examiner

UNITED STATES PATENTS

| | | | |
|---|---|---|---|
| 772,912 | 10/04 | Allam. | |
| 908,324 | 12/08 | Petta | 77—18 |
| 2,595,347 | 5/52 | Flemming | 33—191 |
| 2,757,457 | 8/56 | Ziegelski | 30—366 XR |
| 2,792,726 | 5/57 | Vick. | |

WILLIAM W. DYER, Jr., *Primary Examiner.*
JOHN C. CHRISTIE, *Examiner.*